United States Patent Office 2,882,141
Patented Apr. 14, 1959

2,882,141
SLOW-ACTING FERTILIZER COMPOSITIONS

James M. O'Donnell, Woonsocket, R.I., assignor, by mesne assignments, to Nitro-Form Agricultural Chemical Company, Woonsocket, R.I., a corporation of Rhode Island No Drawing. Application September 16, 1955
Serial No. 534,883

18 Claims. (Cl. 71—30)

This invention relates to an improved multi-component fertilizer composition and more particularly it is directed to an improved solid urea-formaldehyde fertilizer composition admixed or reacted with an amino polycarboxylic acid, salt or chelate thereof.

The urea-formaldehyde polymeric fertilizer compositions which are operable for the practice of this invention have unusual mol ratio latitude thus ranging in ratio of urea/formaldehyde from 1/2 to 2/1. A preferred type of polymer suitable for the practice of this invention has been designated Urea-Form and is generally produced in an acid catalyzed polymerization reaction in which the liquid reactant mol ratio of urea/formaldehyde is >1 and generally has an optimum value of 1.2 to 1.5. Urea-Form products and processes are well-known in the art and are the subject matter of the following: Clark, K. G., Crops and Soils, vol. 4, No. 8 (1952); U.S. Patents 2,415,705, Rohner, and 2,592,806, Kralovec, and Canadian Patent 419,422, Keenan. A novel process for the production of Urea-Form is the subject of O'Donnell copending application entitled, "Production of Fertilizer Compositions," Serial Number 513,379, filed June 6, 1955.

An important advantage of urea-formaldehyde fertilizer compositions as distinguished from nitrate fertilizers is that they provide an insoluble but slowly available source of nitrogen useful during the entire growing season.

The term "urea-formaldehyde" as used in this specification and claims includes such obvious modifications to urea as this urea, melamine, urethan, guanidine and alkyl substituted ureas and thioureas and acetyl urea. It is also contemplated that the formaldehyde component be modified to include para formaldehyde.

The amino polycarboxylic acids, salts and chelates which are incorporated or reacted with the urea-formaldehyde polymer are likewise well-known in the art and are the subject of U.S. patents such as 2,407,645, Bersworth. These compounds are commercially available under the trade name "Versenes" from Versenes Inc. (formerly Bersworth Chemical Company), Framingham, Mass. and "Sequesterenes" from Alrose Chemical Company, Providence, R.I.

Preferred amino-polycarboxylic acids contemplated by this invention include ethylene diamine tetraacetic acid (EDTA), diethylene triamine penta-acetic acid (DTPA), N-hydroxyethyl ethylene diamine triacetic acid (HEEDTA), and N,N$^1$-dihydroxyethyl ethylene diamine triacetic acid and alkali metal salts thereof. Such compounds are well-known chelating or sequestering agents and are used in this invention under soil conditions where by ion exchange or by chelation from the soil their use is indicated: Tetra sodium ethylene diamine tetraacetic acid ($Na_4EDTA$) is illustrative of an alkali metal salt contemplated by this invention.

Preferred chelates selected from alkaline earth and heavy metal salts of amino polycarboxylic acids include ferric disodium ethylene diamine tetraacetic acid ($FeNa_2EDTA$), monosodium ferrous N-hydroxyethyl ethylene diamine triacetic acid (NaFeFEEDTA), magnesium disodium ethylene diamine tetraacetic acid ($MgNaEDTA$), etc.

The term "EDTA compounds" is herein used to refer to the preferred acids, salts and chelates of ethylene diamine tetraacetic acid.

The terms "EDTA type compound" and "ethylene amino polycarboxylic acid compounds" as used herein is intended to refer additionally to such acids, salts and chelates (alkaline earth and heavy metal salts) as diethylene triamine pentaacetic acid (DTPA), N-hydroxyethyl ethylene diamine triacetic acid (HEEDTA), etc.

The term "chelate" as used herein is intended to refer to alkaline earth and heavy metal salts which conventionally form a chelate ring structure.

The use of EDTA chelating agents and EDTA chelates for correcting trace element deficiencies in the soil is old in the art. Stewart et al., Citrus Magazine, June 1952, pages 22–25 describes control of iron chlorosis by means of EDTA compounds and describes the incorporation of these compounds into inert carriers such as vermiculite.

It has also been advanced that in addition to its function in correcting trace element deficiencies in the soil by a chelate mechanism that the EDTA component is absorbed and translocated within the plant where it carries out its beneficial work long after it has left the soil. Weinstein et al., Science, 120 No. 3107, pages 41–43, July 9, 1954.

Weinstein et al. also points out an important deficiency in prior methods of applying EDTA is that EDTA and its metal salts were found to be toxic to plants in high concentrations and these compounds for the most part are liquids or high soluble. An article by Wallace et al., California Agriculture 7, pages 13 and 14 (1953), also points out that excessive applications of EDTA type compounds can result in leaf burning.

Applicant has also been found that this plant stimulation produced by EDTA type compounds or ethylene amino polycarboxylic acid compounds exists under soil trace element deficiency condition as well as normal producing conditions, and that relatively larger concentrations of EDTA type compound are necessary for growth stimulation than for correction of trace element deficiencies. This development has intensified the need for availability of these compositions in relatively high concentrations but slowly available form suitable for an entire growing season.

The problems produced by the high solubility, burning by over-treatment and rapid leaching from the soil by rainfall produced by prior methods of application of EDTA type compounds or ethylene amino polycarboxylic acid compounds, as exemplified by Antognini, Agricultural Chemicals, pages 47–49 (1954), who describes the use of $FeNa_2EDTA$ admixed with dolomite and phosphates have not been solved by the prior art to date.

Therefore it is an object of this invention to provide a novel slowly available amino polycarboxylic acid composition suitable as a growth stimulant.

It is the further object of this invention to provide a novel fertilizer composition comprising a resinous slowly available source of nitrogen and a slowly available amino polycarboxylic acid composition.

It is a further object of this invention to provide a novel urea-formaldehyde fertilizer composition which contains as an additional active ingredient an amino polycarboxylic acid, salt or chelate.

It is a further object of this invention to provide a novel urea-formaldehyde fertilizer composition admixed or reacted in situ with an EDTA type compound.

It is still a further object of this invention to provide a novel urea-formaldehyde fertilizer composition admixed or reacted with 2–20% ethylene diamine tetraacetic acid and alkali metal salts and chelates thereof.

The compositions which are the subject of this invention have utility as fertilizers and growth stimulants.

GENERALIZED PROCEDURE

Generally a preferred method for preparing the compositions of this invention is by an incorporation of the amino polycarboxylic acid compound into a monomeric urea formaldehyde mother liquor followed by an in situ polymerization to produce the bifunctional fertilizer composition:

As an alternative procedure, the amino polycarboxylic acid component may be mixed with either the urea or the formaldehyde and later subjected to polymerization.

The mechanism of the reaction is not understood. The amino polycarboxylic acid component may be merely integrally admixed or it may be chemically bound up in the completed urea formaldehyde fertilizer resin but the test results to date have been inconclusive.

The amount of amino polycarboxylic acid compound or the preferred EDTA type compound to be added to the urea formaldehyde is contingent largely on the following factors:

(1) Rate of release required in a determined amount of time.
(2) Rate of growth stimulant or trace element application desired per given area.
(3) Frequency and extent of solubilizing factors such as rainfall.
(4) Soil condition.
(5) The extent to which nitrogen in a slowly available form is desired.

This invention contemplates a preferred range of the amino polycarboxylic acid component of from 2% to 20% (calculated as EDTA) based on the dried weight of the fertilizer composition.

EXAMPLES OF PREPARATION AND USE

Example 1

The quantities of urea and formaldehyde used were in the ratio of 1 urea to 2 formaldehyde or $$\frac{U}{F} = \frac{1}{2}$$

The formaldehyde (37% aqueous) was heated to 70° C. and diethanol amine was added in sufficient quantities to maintain a pH of 8.5. Urea was then added and negative heat of solution brought the temperature down to about 50° C. After the urea was completely dissolved, enough $Na_4EDTA$ was added to give a concentration of 10% based on the total amount of urea formaldehyde liquors.

This mixture was continually introduced onto a moving stainless steel belt at a rate sufficient to maintain a thickness on said belt of ¼″ to ½″ and at a pH of 3.0 and a temperature of 50° C. HCl was used to acidify. The mixture polymerized very rapidly and formed a smooth continuous film on the surface of the belt. The forming polymeric material remained on the moving belt for a total time of four minutes when it was subjected to neutralization with a spray of diethanolamine to a pH of 6.5 to 7.0.

The polymeric fertilizer was then continuously scraped from the belt and dried at 120° C. in a natural frequency conveyor. The material was analyzed and found to contain 20% EDTA based on the dried solid weight of the composition.

Example 2

The procedure of Example 1 was used but substituting $FeNa_2EDTA$ for $Na_4EDTA$ (ferric disodium EDTA used).

Example 3

The procedure of Example 1 was used but a modified U/F=1.1 was employed.

Example 4

The procedure of Example 3 was used but substituting $FeNa_2EDTA$ for $Na_4EDTA$.

Example 5

The procedure of Example 1 was used but a modified U/F=1.3:1 was employed.

Example 6

The procedure of Example 5 was used but substituting $FeNa_2EDTA$ for $Na_4EDTA$.

Example 7

The procedure of Example 1 was used but a modified U/F=2:1 was employed.

Example 8

The procedure of Example 1 was used but substituting $MgNa_2EDTA$ for $Na_4EDTA$.

Example 9

The procedure of Example 1 was used but a modified U/F=1.5:1 was used.

Other examples were prepared similar to Examples 1 to 9 in which the concentration of the EDTA component calculated as the weight of acid in the dried polymeric composition was reduced to other values in the preferred range 2 to 20%.

Example 10

($Na_4EDTA$—10%)

A method for testing the extent to which EDTA and its alkali metal salts were insolubilized to a slowly available form using various U/F ratios was developed using a $CaCO_3$ solution.

A standard solution of $CaCO_3$ was prepared in which the $Ca^{++}$ ions were present to the extent of 100 p.p.m. as measured on a potentiometric scale. To 100 ml. of this solution was added a quantity of resinified $Na_4EDTA$ sufficient theoretically from the 10% of $Na_4EDTA$ in the resin to deionize the $Ca^{++}$ ions.

The solution was gently stirred for five minutes and then allowed to stand for twenty-four hours in a stoppered 150 cc. Erlenmeyer flask. The concentration of $Ca^{++}$ ions was measured and recorded and this process was carried out at twenty-four hour intervals until the decrease (i.e., chelation) of calcium ions remained constant. By this method the slow acting technique of the combination of $Na_4EDTA$ and several mol ratios of urea-formaldehyde resin was shown and representative results are shown in the following:

CHART

| U/F: | Percent Chelation Using 10% $Na_4EDTA$ | | | |
|---|---|---|---|---|
| 1.5:1 | 28 | 57 | 66 | 66 |
| 1.3:1 | 23 | 52 | 62 | 66 |
| 2:1 | 2 | 10 | 13 | 22 |
| Time in Weeks | 1 | 5 | 9 | 11 |

FIELD TESTS

| | Tomatoes | | | Lettuce | | |
|---|---|---|---|---|---|---|
| | Dry Wt. | Percent N. Regained | Increased Percent Yield | Dry Wt. | Percent N. Take-up | Increased Percent Yield |
| Control | 16 | 20 | 0 | 16 | 16 | 0 |
| N. Salts | 32 | 40 | 200 | 33 | 0 | 200 |
| Ureaform 1:3 Moles | 60 | 80 | 400 | 62 | 75 | 400 |
| Example #2 | 80 | 86 | 500 | 96 | 85 | 600 |
| Example #5 | 85 | 84 | 503 | 100 | 86 | 600 |
| Example #6 | 80 | 87 | 500 | 98 | 84 | 600 |
| Unresinified $FeNa_2EDTA$ | 10 | 4 | 2 | Burnt Out | | |

Experiments were made on medium to heavy silt loam. Experimental plots were limed to a pH of 7.0 prior to applications. Nitrogen was applied at the rate of 100 lbs. per acre, where the nitrogen content of the resin was not sufficient to maintain this level the added nitrogen was derived from urea. In control plots marked "N. Salts" the nitrogen was derived solely from urea. The application of chelating agents was standard in all the above cases being 15 lbs. per acre of EDTA. The added weight of chelated metals was not considered as active EDTA. The applications were made on the basis of active EDTA alone.

The terms "high level fertilizer composition," "high level EDTA composition" and similar language in the present specification and claims are defined and intended to mean a non-burning fertilizer composition capable of being applied to the soil in amount of at least 15 pounds per acre of EDTA (calculated as the free acid).

Field tests have shown the agronomic value of the resinified amino polycarboxylic acid in increased production and prevention of burn out of crops. Additional experiments using 12% FeNa$_2$EDTA in a urea formaldehyde resin showed that it was possible to apply as much as 20 pounds per acre of 12% FeNa$_2$EDTA to lettuce crops with no damage to the plants where previous applications had to be restricted to 1½ pounds to 2 pounds per acre. Also tests with field corn in muck soil with the same compound show significant increases in yield up to 100% over nitrate fertilizers when resinified FeNa$_2$EDTA was applied in excess of 15 pounds per acre.

Having thus described this invention which includes such alterations, equivalents and substitutions as might be readily devised by a worker skilled in the art and is not to be limited except by the following language and meaning in the appended claims.

Therefore, I claim:

1. A slow-acting high-level polymeric fertilizer composition comprising (a) a urea-formaldehyde resin as a major component and (b) an ethylene amino carboxylic acid compound integrally admixed in the polymer in amount of about 2–20% by weight of said composition.

2. The composition of claim 1 wherein the urea-formaldehyde resin is acid catalyzed and has a urea-formaldehyde ratio greater than 1.

3. The composition of claim 1 wherein the amino polycarboxylic acid compound is ferric disodium ethylene diamine tetraacetic acid.

4. The composition of claim 1 wherein the amino polycarboxylic acid compound is tetra sodium ethylene diamine tetraacetic acid.

5. The composition of claim 1 wherein the amino polycarboxylic acid compound is magnesium disodium ethylene diamine tetraacetic acid.

6. The composition of claim 1 wherein the amino polycarboxylic acid compound is ethylene diamine tetraacetic acid.

7. The composition of claim 1 wherein the amino polycarboxylic acid compound is ferric hydroxyethyl ethylene diamine triacetic acid.

8. A method of treating soil which comprises incorporating therein a composition comprising an amino polycarboxylic acid compound and a urea-formaldehyde resin.

9. A method of treating soil which comprises incorporating therein a slow acting fertilizer composition comprising an amino polycarboxylic acid compound integrally admixed with a urea-formaldehyde resin.

10. A method of treating soil which comprises incorporating therein a composition comprising a urea-formaldehyde resin intimately admixed with an ethylene amino, polycarboxylic acid compound.

11. A method of treating soil which consists in incorporating therein a slow acting high-level fertilizer composition comprising a urea-formaldehyde resin in which the mol ratio of urea to formaldehyde is greater than one intimately admixed in situ with an ethylene amino polycarboxylic acid compound in amount by weight of 2–20% of said composition.

12. A method of treating soil which comprises incorporating therein a slow acting high-level fertilizer composition comprising an acid catalyzed urea-formaldehyde resin in which the mol ratio of urea to formaldehyde lies within the range 1.3:1 to 1.5:1 intimately admixed in situ with an ethylene amino polycarboxylic acid compound in amount by weight of 2–20% of said composition.

13. A method of treating soil which comprises incorporating therein a slow-acting high-level polymeric fertilizer composition comprising (a) a urea-formaldehyde resin as a major component and (b) an ethylene amino carboxylic acid compound integrally admixed in the polymer in amount by weight of about 2–20% of said composition.

14. The method of claim 13 wherein the ethylene amino polycarboxylic acid compound is ferric disodium ethylene diamine tetraacetic acid.

15. The method of claim 13 wherein the ethylene amino polycarboxylic compound is tetra-sodium ethylene diamine tetraacetic acid.

16. The method of claim 13 wherein the ethylene amino polycarboxylic acid compound is magnesium disodium ethylene diamine tetraacetic acid.

17. The method of claim 13 wherein the ethylene amino polycarboxylic acid compound is ethylene diamine tetraacetic acid.

18. The method of claim 13 whereni the ethylene amino polycarboxylic acid compound is ferric hydroxyethyl ethylene diamine triacetic acid.

References Cited in the file of this patent

UNITED STATES PATENTS

| | | |
|---|---|---|
| 2,502,996 | Rohner | Apr. 4, 1950 |
| 2,618,546 | Davenport | Nov. 18, 1952 |

OTHER REFERENCES

Citrus Magazine, "Iron Chlorosis . . . Control," June 1952, pages 22–25.

Agricultural Chemicals, "Iron Chelates Control Iron Chlorosis," by J. Antognini, November 1954, pages 47–49.